UNITED STATES PATENT OFFICE.

FRANCIS J. KOVACH, OF CAMBRIDGE, MASSACHUSETTS, ASSIGNOR TO JOSIAH COLBY BASSETT, OF CAMBRIDGE, MASSACHUSETTS, THEODORE EDISON PARKER, OF NEW BEDFORD, MASSACHUSETTS, AND HENRY FRANCIS STROUT, OF MOUNT VERNON, NEW YORK, TRUSTEES.

FLUX AND PROCESS OF MAKING THE SAME.

No. 881,081.     Specification of Letters Patent.     Patented March 3, 1908.

Application filed April 3, 1907. Serial No. 366,120.

*To all whom it may concern:*

Be it known that I, FRANCIS J. KOVACH, of Cambridge, in the county of Middlesex and State of Massachusetts, have invented certain new and useful Improvements in Fluxes and Processes of making the same, of which the following is a specification.

This invention has relation to the brazing of metals and has for its object to provide, first, a flux which will not ebulliate or intumesce in the process of brazing, and second, a method of making the flux.

In brazing two metallic parts such as pieces of cast iron, the surfaces to be joined are cleaned in any suitable manner and between them is placed a suitable material containing iron filings or the like. Preferably this mass consists of boro-boracic acid such as described in Letters Patent of the United States, No. 756,080 dated March 29, 1904, and iron filings. The parts to be brazed are held in position and are heated at their joint to a high temperature. The flux which is in a powdered form is placed upon the joint and penetrates the interstices and cracks between the parts, after which spelter is placed on the joint. After being heated, the spelter follows the flux and completely fills the interstices and spaces between the parts.

Heretofore with all fluxes that have been used, considerable difficulty has been experienced owing to ebullition or intumescence which prevents the spelter from completely filling the interstices between the parts to be brazed, and otherwise prevents the brazing from being accomplished most efficiently. My flux is a powder which is the product of a mixture of borax ($Na_2B_4O_7$) and boracic acid or boracic anhydrid ($B_2O_3$) from which all moisture has been removed, so that when subsequently heated, it is incapable of ebullition. This flux is produced as follows: Into a pot or kettle is placed a quantity of borax, say twenty pounds, and upon it is placed a quantity of boracic acid, twenty pounds more or less. Then without the addition of other substances, the mass is heated to a high degree of temperature, the lumps are broken or reduced and the mass is agitated or mixed. When the proper temperature is reached, the mass begins to ebulliate, and the heating is continued until the ebullition has ceased, and the mass has solidified to about the consistency of chalk. During the heating process, the ebullition still further mixes the boracic acid and the borax. The dried mass is then permitted to cool and after being removed from the kettle is ground and mixed, and is then ready for use. The weight of the mass is diminished by the heating and boiling process approximately 35%. I have found that by continuing the heating of the mass, all moisture is driven off, so that when the flux is used in brazing, there is no ebullition or intumescence, the powder melting in the way that butter does under a mild heat, so that it completely penetrates the interstices and cracks.

What I claim is:—

1. A pulverulent non-intumescing flux, consisting of a mixture of boracic acid and borax from which all water has been removed.

2. The herein described process of producing a non-intumescing flux which consists in subjecting borax and boracic acid to a high heat, until ebullition ceases, permitting the mass to cool and then reducing it to small particles.

In testimony whereof I have affixed my signature, in presence of two witnesses.

FRANCIS J. KOVACH.

Witnesses:
MARCUS B. MAY,
J. F. RICHARDSON.